March 21, 1933.  M. WASSERBERG  1,902,001
OWNERSHIP IDENTIFICATION DEVICE
Filed Aug. 27, 1932
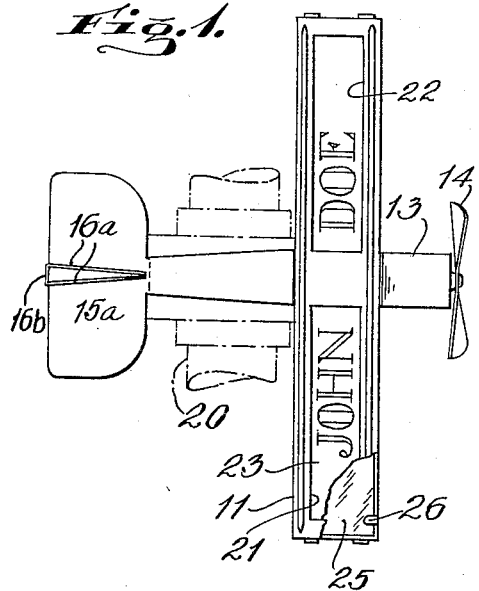
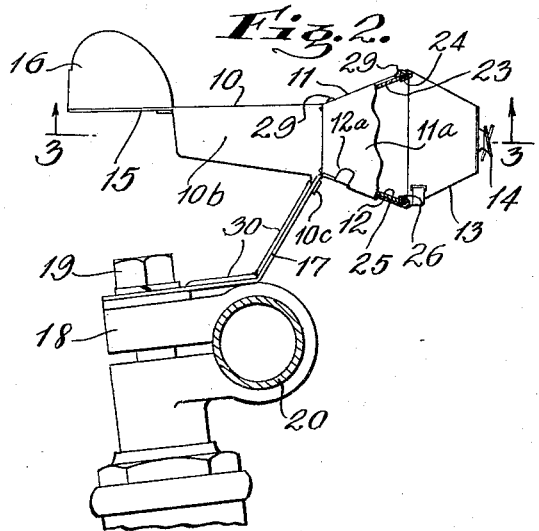
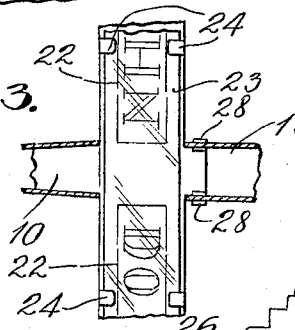
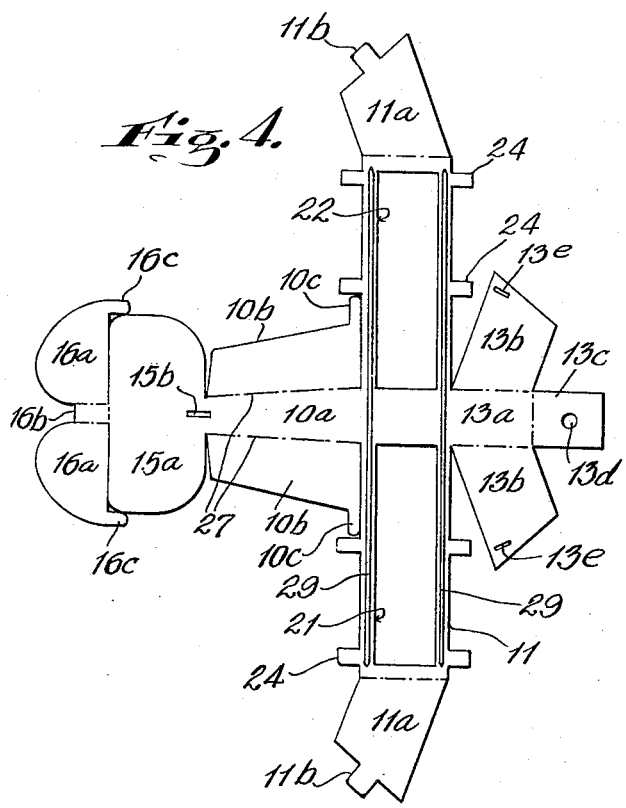
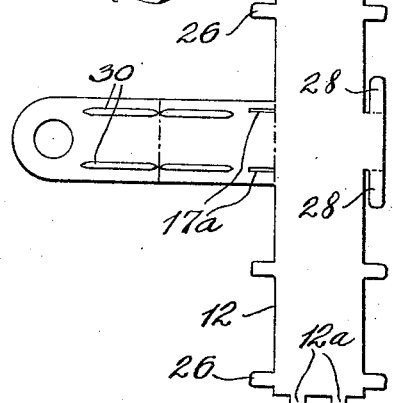
INVENTOR.
MAX WASSERBERG
BY
ATTORNEY Patented Mar. 21, 1933

1,902,001

UNITED STATES PATENT OFFICE

MAX WASSERBERG, OF BROOKLYN, NEW YORK

OWNERSHIP IDENTIFICATION DEVICE

Application filed August 27, 1932. Serial No. 630,629.

This invention relates to devices for use in conjunction with cycles or wheeled vehicles of various kinds and classes to provide means for identifying the maker of the vehicle or the owner thereof; and the object of the invention is to provide a device of the class specified fashioned from sheet metal parts to form a miniature aeroplane of the biplane type with means on one of the wings for supporting a name strip of transparent or translucent material in connection therewith and the other wing including a reflector surface onto which the name is reflected to provide an attractive means of identification; a further object being to provide a device of the class described which is fashioned from two sheet metal blanks folded and interlocked with respect to each other to form the representation of an aeroplane and including a propellor supported in connection with one of the sheet metal parts, and the other part having an extending bracket by means of which the device may be mounted in connection with a suitable support; a further object being to provide means for reinforcing parts of the device to strengthen such parts; and with these and other objects in view, the invention consists in a device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a plan view of an identification device made according to my invention, with part of the construction broken away.

Fig. 2 is a side view of the structure shown in Fig. 1.

Fig. 3 is a partial section on the line 3—3 of Fig. 2.

Fig. 4 is a plan view of one of the blanks which I employ in forming the device; and, Fig. 5 is a plan view of another blank.

In one method of carrying my invention into effect, I fashion the identification device into the form of an aeroplane of the biplane type. In Figs. 1 and 2, 10 represents the fuselage of the aeroplane; 11 the upper wings; 12 the lower wings; and 13 a forwardly directed central nose part in connection with which is supported a rotatable propeller 14. At the rear of the fuselage 10 is a tail plane 15 including centrally of its upper face a rudder 16.

Extending from the bottom of the fuselage or the wings 12, is an angular supporting bracket 17 facilitating the mounting of the device in connection with a suitable support, such for example as the center post or bracket 18 of a bicycle, velocipede or similar vehicle, by removing the usual nut 19 and passing the same through an aperture in the bracket 17 and then clamping the same in position. The post 18 supports the usual handle bars 20 of the vehicle, and it will thus be seen that the identification device will be supported centrally of and above the handle bars so as to be readily seen.

The upper wings 11 of the device have large openings 21 and 22 formed therein at opposite sides of the central fuselage portion of the wings outwardly to the ends thereof, so as to provide openings through which light is adapted to pass. In practice, I support on the under face of the wings 11, a strip 23 of translucent or transparent material held in place by clips 24 formed at the side edges of the wings. The strip 23 contains the name or other symbol characterizing the maker or owner of the vehicle, such for example as the name John Doe, as indicated in Fig. 1 of the drawing.

An elongated sheet or strip 25 of reflecting material or a strip having a reflecting surface is mounted upon the inner face of the wings 12 and held in place by clips 26 formed at the edges of said wings so that by virtue of the angular arrangement of the wing 11 with respect to the wing 12, the name or symbol appearing on the strip 23 will be transmitted to and readable on the reflecting surface of the strip 25, producing an attractive and luminous identification.

In forming the device shown in Figs. 1 and 2, I employ blanks of sheet material such as shown in Figs. 4 and 5 of the drawing. The upper wings 11, fuselage 10, tail plate 15, rudder 16 and projecting nose or propeller supporting part 13 are formed from the blank shown in Fig. 4, whereas the lower wings 12 and bracket 17 are formed from the blank shown in Fig. 5. The fuselage 10 is formed from a top part 10a and side parts 10b foldable downwardly with respect to the part 10a on the lines 27. The side parts 10b include projecting clips 10c which pass through apertures 17a formed in the bracket 17 so as to support the rear edges of the wings 11, 12 against separation as will be apparent.

The tail plane 15 is formed from the part 15a, whereas the rudder is formed from two parts 16a joined by a crosshead 16b, and the outer ends of the parts 16a include clips 16c which pass through an aperture 15b formed in the part 15a to support the rudder in position.

The extension 13 is formed from a top part 13a and side walls 13b and a front wall 13c, the latter having an aperture 13d to receive the axis for the propeller 14. The outer corner portions of the side members 13b have apertures 13e through which clips 28 formed on an extending part centrally of the wings 12 are adapted to pass to brace the front edges of the wings 11 and 12 and prevent their separation. The wings 11 extend from the central part of the fuselage or from that part of the blank intermediate the parts 10a, 13a. The side walls of the wings 11 are preferably ribbed upwardly as seen at 29 to reinforce the same.

In addition to having the clips 24 at the side edges of the wings 11, the ends of said wings include end walls 11a having projecting tongues or clips 11b centrally thereof which are adapted to be folded around the side edges of the wings 12 formed from the blank shown in Fig. 5, and intermediate corresponding pairs of projecting tongues or clips 12a at the ends of said wings 12. The tongues 12a are foldable around the walls 11a to aid in coupling the outer end portions of the wings together.

The retaining clips 26 for the strip 25 are shown disposed at opposite sides of the blank shown in Fig. 5 of the drawing. It is also preferred that the bracket 17 be reinforced at its side edges by ribs or beads 30. These ribs as well as the ribs or beads 19 are employed when thin material such as sheet metal is used.

One of the uses for which my invention is devised, is to provide means whereby the purchaser or owner of a cycle or other wheeled vehicle, such for example as bicycles, tricycles, sidewalk bikes, scooter bikes and the like may apply his or her name to the vehicle by attaching the same to my improved identification device. With this use, after the vehicle has been purchased, the manufacturer and/or distributor will supply to the purchaser or owner a transparent or translucent strip on which the name of the purchaser or owner is formed. The name may be formed by opaque lettering with a transparent or translucent background, or the names may be stenciled or cut from the strip, in which latter case, it is preferred that the strip will be of a predetermined color, sufficiently dark to offset the lettering, and in some cases, may be so colored as to be substantially opaque.

From the foregoing, it will be understood that when the identification device is sold with the vehicle, the clips 24 will be left in their open position, and bent over to secure the strip 23 in place, after the latter has been supplied to the purchaser or owner.

It will also be understood that I am not necessarily limited to the use of the strip 25, as the reflecting surface may be formed as part of the wings 12, and various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. An identification device of the class described, of a contour representing a multiple wing aeroplane, said device having a projecting bracket portion by means of which the same may be mounted in connection with a suitable support, means for supporting a characterized strip in connection with one wing of the device to permit the transmission of light through the strip so supported, and another wing of said device having a closed wall arranged in spaced and angular relation with respect to said first wing and including a reflector surface on which the characters of said strip may be seen.

2. An identification device of the class described, of a contour representing a multiple wing aeroplane, said device having a projecting bracket portion by means of which the same may be mounted in connection with a suitable support, means for supporting a characterized strip in connection with one wing of the device to permit the transmission of light through the strip so supported, another wing of said device having a closed wall arranged in spaced and angular relation with respect to said first wing and including a reflector surface on which the characters of said strip may be seen, said reflector surface being formed on an independent plate, and means for securing said plate in connection with the second named wing.

3. A device for identifying ownership of a wheeled vehicle, said device comprising a body characterized to represent a predetermined article, said device having a reflector surface, means arranged in spaced and angular relation with respect to said reflector surface for supporting a name plate in connection therewith, said name plate being so formed as to permit the transmission of the name onto the reflector surface by light rays passing through said plate, said device including a bracket for supporting the same in connection with the vehicle, said device being in the form of an aeroplane of the biplane type, the reflector surface being arranged on the inner side of the lower wings and the name plate supporting means constituting the upper wings of the aeroplane, and said aeroplane including the supporting bracket being formed from two sheet blanks, one blank forming the upper wings, fuselage, tail plane and rudder as well as a forwardly extending propeller supporting member.

4. A device for identifying ownership of a wheeled vehicle, said device comprising a body characterized to represent a predetermined article, said device having a reflector surface, means arranged in spaced and angular relation with respect to said reflector surface for supporting a name plate in connection therewith, said name plate being so formed as to permit the transmission of the name onto the reflector surface by light rays passing through said plate, said device including a bracket for supporting the same in connection with the vehicle, said device being in the form of an aeroplane of the biplane type, the reflector surface being arranged on the inner side of the lower wings and the name plate supporting means constituting the upper wings of the aeroplane, said aeroplane including the supporting bracket being formed from two sheet blanks, one blank forming the upper wings, fuselage, tail plane and rudder as well as a forwardly extending propeller supporting member, and the other blank forming the lower wings and said bracket.

5. A device for identifying ownership of a wheeled vehicle, said device comprising a body characterized to represent a predetermined article, said device having a reflector surface, means arranged in spaced and angular relation with respect to said reflector surface for supporting a name plate in connection therewith, said name plate being so formed as to permit the transmission of the name onto the reflector surface by light rays passing through said plate, said device including a bracket for supporting the same in connection with the vehicle, said device being in the form of an aeroplane of the biplane type, the reflector surface being arranged on the inner side of the lower wings and the name plate supporting means constituting the upper wings of the aeroplane, said aeroplane including the supporting bracket being formed from two sheet blanks, one blank forming the upper wings, fuselage, tail plane and rudder as well as a forwardly extending propeller supporting member and the other blank forming the lower wings and said bracket, and the reflector surface being formed by an independent plate mounted in connection with the lower wings and means on said wings for retaining the plate against displacement therefrom.

6. The combination with a wheeled vehicle of a miniature aeroplane, means for mounting the aeroplane in connection with a part of the vehicle, means for supporting a name plate identifying ownership of the vehicle in connection with the aeroplane, the name plate being in the form of a translucent strip, a reflector surface arranged in spaced and angular relation with respect to said name plate whereby rays of light will reflect the name on said plate onto said reflector surface, and said aeroplane being composed of two sheet metal blanks, one blank forming one wing, the fuselage, tail plane and rudder and the other blank another wing and said bracket.

7. The combination with a wheeled vehicle of a miniature aeroplane, means for mounting the aeroplane in connection with a part of the vehicle, means for supporting a name plate identifying ownership of the vehicle in connection with the aeroplane, the name plate being in the form of a translucent strip, a reflector surface arranged in spaced and angular relation with respect to said name plate whereby rays of light will reflect the name on said plate onto said reflector surface, said aeroplane being composed of two sheet metal blanks, one blank forming one wing, the fuselage, tail plane and rudder and the other blank another wing and said bracket, and inter-engaging means on said blanks for retaining the blank parts together in aeroplane formation.

8. A device for identifying ownership of a wheeled vehicle, said device comprising a body in the form of an aeroplane having two wings, one wing of said device having a reflector surface, a name plate on the other wing, said name plate being formed to permit the transmission of the name onto the reflector surface by light rays passing through said plate, and said wings being angularly disposed with respect to each other.

9. A device for identifying ownership of a wheeled vehicle, said device comprising a body in the form of an aeroplane having two wings, one wing of said device having a reflector surface, a name plate on the other wing, said name plate being formed to permit the transmission of the name onto the reflector surface by light rays passing through said plate, said wings being angularly disposed with respect to each other, said body including a fuselage extending from said wings, and a bracket projecting from said fuselage for supporting the device in connection with the vehicle.

10. In an aeroplane identification device of the class described, two sheet metal blanks, each blank including a wing portion, means for coupling said blanks together to arrange said wings in spaced and angularly disposed relation with respect to each other, means on one of said wings for supporting a name plate in connection therewith, and the other wing including a reflector surface upon which the characters of the name plate may be seen by the transmission of light through said plate onto said surface.

11. In an aeroplane identification device of the class described, two sheet metal blanks, each blank including a wing portion, means for coupling said blanks together to arrange said wings in spaced and angularly disposed relation with respect to each other, means on one of said wings for supporting a name plate in connection therewith, the other wing including a reflector surface upon which the characters of the name plate may be seen by the transmission of light through said plate onto said surface, and one of said blanks including an integral projecting bracket portion by means of which the device may be mounted in connection with a suitable support.

In testimony that I claim the foregoing as my invention I have signed my name this 25th day of August, 1932.

MAX WASSERBERG.